(12) United States Patent
Mel et al.

(10) Patent No.: US 8,971,614 B2
(45) Date of Patent: Mar. 3, 2015

(54) EXTRACTING OBJECT EDGES FROM IMAGES

(71) Applicants: Bartlett W. Mel, Manhattan Beach, CA (US); Chaithanya A. Ramachandra, Los Angeles, CA (US)

(72) Inventors: Bartlett W. Mel, Manhattan Beach, CA (US); Chaithanya A. Ramachandra, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 53 days.

(21) Appl. No.: 13/894,276

(22) Filed: May 14, 2013

(65) Prior Publication Data
US 2013/0301910 A1    Nov. 14, 2013

Related U.S. Application Data

(60) Provisional application No. 61/646,514, filed on May 14, 2012.

(51) Int. Cl.
*G06K 9/48* (2006.01)
*A61B 5/00* (2006.01)
*G06T 7/00* (2006.01)

(52) U.S. Cl.
CPC .............. *G06T 7/0085* (2013.01); *G06T 7/0087* (2013.01); *G06T 2207/20081* (2013.01)
USPC ............................ 382/159; 382/199; 600/300

(58) Field of Classification Search
CPC ........... G06K 9/00335; G06K 9/00221; G06T 7/0085; G06T 7/0087; G06T 2207/20081; G06T 7/00
USPC ......... 382/118, 103, 133, 131, 159, 190, 199, 382/236, 243, 254, 276; 600/300, 301, 545, 600/473
See application file for complete search history.

(56) References Cited

U.S. PATENT DOCUMENTS 5,774,591 A * 6/1998 Black et al. .................... 382/236
5,802,220 A * 9/1998 Black et al. .................... 382/276

(Continued)

OTHER PUBLICATIONS

Rana Ayman El Kaliouby, Mind-reading machines: automated inference of complex mental states, Jul. 2005, University of Cambridge, Cambridge, United Kingdom, pp. 185.*

(Continued)

*Primary Examiner* — Sheela Chawan
(74) *Attorney, Agent, or Firm* — McDermott Will & Emery LLP

(57) ABSTRACT

A computer system may elicit from a human observer ground truth data useful in automatically detecting one or more features in images. The elicitation may include presenting an image to a human observer that has a visual indicator in an image, the visual indicator indicating having a location and orientation with respect to the image; asking the human observer to judge whether a particular image feature is present in the image at the location and orientation indicated by the visual indicator; receiving input from the human observer indicative of whether the particular image feature is present at the location and orientation indicated by the visual indicator; storing the input received from the human observer as part of the human-labeled ground truth data; and repeating the process described above one or more times in connection with a visual indicator that has a different location or orientation with respect to the image or that uses a different image. The stored human-labeled ground truth data may have a content that is useful in automatically detecting one or more features in other images.

16 Claims, 11 Drawing Sheets

(56) References Cited

U.S. PATENT DOCUMENTS

| | | | | |
|---|---|---|---|---|
| 6,919,892 | B1* | 7/2005 | Cheiky et al. | 345/473 |
| 7,027,054 | B1* | 4/2006 | Cheiky et al. | 345/473 |
| 7,958,063 | B2* | 6/2011 | Long et al. | 706/12 |
| 8,488,863 | B2* | 7/2013 | Boucheron | 382/133 |
| 2009/0285456 | A1* | 11/2009 | Moon et al. | 382/118 |
| 2010/0191124 | A1* | 7/2010 | Prokoski | 600/473 |

OTHER PUBLICATIONS

Dollar, P. et al. 2006. Supervised Learning of Edges and Object Boundaries. In Proceedings of the 2006 IEEE Computer Society Conference on Computer Vision and Pattern Recognition—vol. 2, 1964-1971. IEEE Computer Society, 2006. http://portal.acm.org/citation.cfm?id=1153171.1153683.

Geisler, W.S. et al. 2001. Edge Co-occurrence in Natural Images Predicts Contour Grouping Performance. Vision Research 41, No. 6 (Mar. 2001): 711-724.

Konishi, S. et al. 2003. A Statistical Approach to Multi-scale Edge Detection. Image and Vision Computing 21, No. 1 (Jan. 10, 2003): 37-48. doi:10.1016/S0262-8856(02)00131-2.

Martin, D.R. et al. 2004. Learning to Detect Natural Image Boundaries Using Local Brightness, Color, and Texture Cues. IEEE Trans. Pattern Anal. Mach. Intell. 26, No. 5 (2004): 530-549.

\* cited by examiner

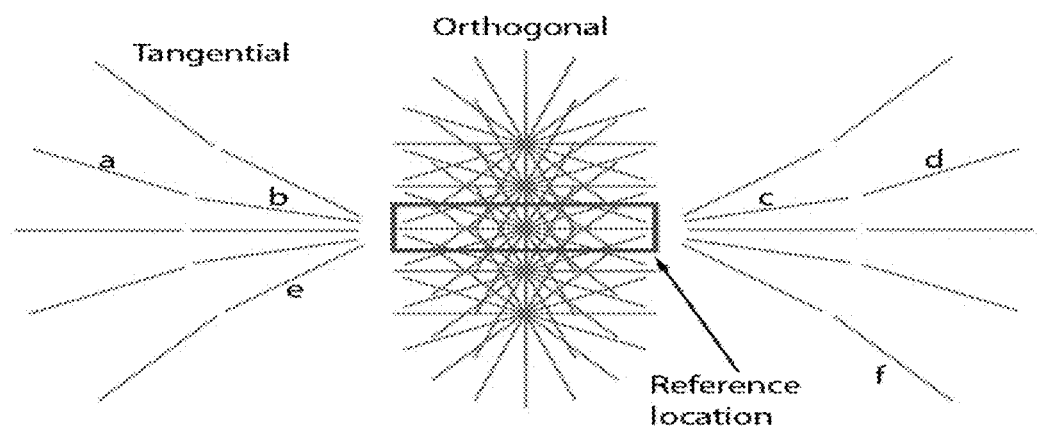
FIG. 1
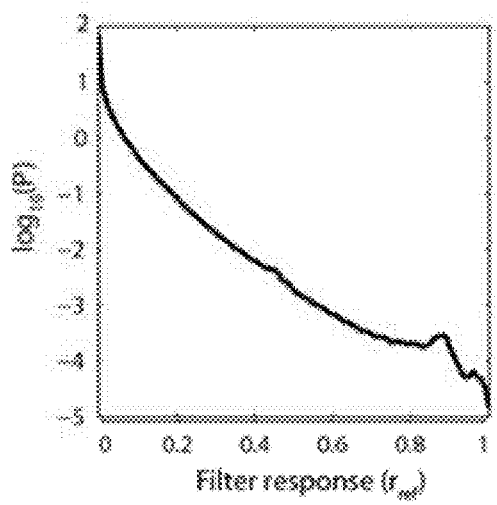
FIG. 2A
FIG. 2B
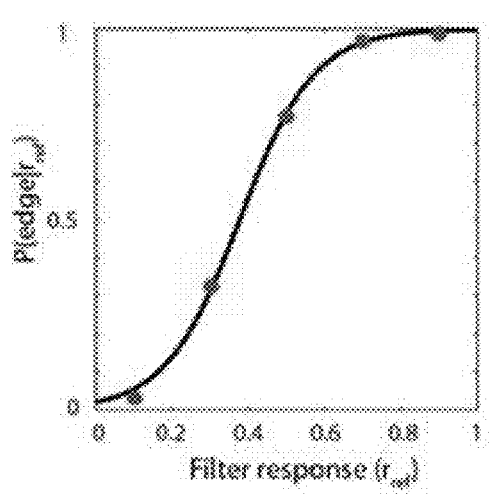
FIG. 2D

EXTRACTING OBJECT EDGES FROM IMAGES

CROSS-REFERENCE TO RELATED APPLICATION

This application is based upon and claims priority to U.S. provisional patent application 61/646,514, entitled "METHOD FOR EXTRACTING OBJECT EDGES FROM NATURAL IMAGES," filed May 14, 2012. The entire content of this application is incorporated herein by reference.

STATEMENT REGARDING FEDERALLY SPONSORED RESEARCH

This invention was made with government support under Grant No. NIH/NEI (EY016093) awarded by National Institutes of Health/National Eye Institute (NIH/NEI). The government has certain rights in the invention.

BACKGROUND

1. Technical Field

This disclosure relates to extracting object edges from images.

2. Description of Related Art

Detecting object contours can be a key step to object recognition. See Biederman, I. (1987), "*Recognition-by-components: A theory of human image understanding*" Psychological Review, 94(2), 115-147, doi:10.1037/0033-295X.94.2.115; Biederman, I., & Ju, G. (1988), "*Surface versus edge-based determinants of visual recognition*", Cognitive Psychology, 20(1), 38-64. doi:10.1016/0010-0285(88)90024-2; DeCarlo, D. (2008, August 12), "*Perception of line drawings*", Presented at the SIGGRAPH 2008, Retrieved from http://gfx.cs.princeton.edu/proj/sg08lines/lines-7-perception.pdf; Kourtzi, Z., & Kanwisher, N. (2001), "*Representation of Perceived Object Shape by the Human Lateral Occipital Complex*", Science, 293(5534), 1506-1509, doi:10.1126/science.1061133; Lowe, D. G. (1999), "*Object recognition from local scale-invariant features*", The Proceedings of the Seventh IEEE International Conference on Computer Vision, 1999, (Vol. 2, pp. 1150-1157 vol. 2), Presented at The Proceedings of the Seventh IEEE International Conference on Computer Vision, 1999, IEEE. doi:10.1109/ICCV. 1999.790410; Marr, D. (1983), "*Vision: A Computational Investigation into the Human Representation and Processing of Visual Information*", Henry Holt and Company; Papari, G., & Petkov, N. (2011), "*Edge and line oriented contour detection: State of the art*", Image and Vision Computing, 29(2-3), 79-103. doi:10.1016/j.imavis.2010.08.009.

A computation in visual cortex may be the extraction of object contours, where the first stage of processing is commonly attributed to V1 simple cells. The standard model of a simple cell—an oriented linear filter followed by a divisive normalization—may fit a wide variety of physiological data, but may be a poor performing local edge detector when applied to natural images. The brain's ability to finely discriminate edges from non-edges therefore may depend on information encoded by local oriented cell populations.

Algorithms that detect object contours in natural scenes may not be completely accurate. Raising thresholds or applying an expansive output nonlinearity (Heeger, D. J. (1992), "*Half-squaring in responses of cat striate cells*", Visual Neuroscience, 9(05), 427-443, doi:10.1017/S095252380001124X) can sharpen tuning curves to an arbitrary degree, but may not be an effective strategy from an edge-detection perspective because the underlying linear filtering operation may not be able to distinguish properly aligned low contrast edges from misaligned high contrast ones (or a multitude of contrast non-edge structures). This weakness may not be remedied by output thresholding.

Other edge/contour detection algorithms may exploit the Gestalt principle of "good continuation" or related principles to improve detection performance See Choe, Y., & Miikkulainen, R. (1998), "*Self-organization and segmentation in a laterally connected orientation map of spiking neurons*", Neurocomputing, 21(1-3), 139-158, doi:10.1016/50925-2312(98)00040-X; Elder, J. H., & Zucker, S. W. (1998), "*Local scale control for edge detection and blur estimation*", IEEE Transactions on Pattern Analysis and Machine Intelligence, 20(7), 699-716, doi:10.1109/34.689301; Grossberg, S., & Williamson, J. R. (2001), "*A Neural Model of how Horizontal and Interlaminar Connections of Visual Cortex Develop into Adult Circuits that Carry Out Perceptual Grouping and Learning*", Cerebral Cortex, 11(1), 37-58, doi: 10.1093/cercor/11.1.37; Guy, G., & Medioni, G. (1992), "*Perceptual grouping using global saliency-enhancing operators*", 11th IAPR International Conference on Pattern Recognition, 1992. Vol. I. Conference A: Computer Vision and Applications, Proceedings (pp. 99-103), Presented at the 11th IAPR International Conference on Pattern Recognition, 1992. Vol. I. Conference A: Computer Vision and Applications, Proceedings. doi:10.1109/ICPR. 1992.201517; Li, Z. (1998), "*A Neural Model of Contour Integration in the Primary Visual Cortex*", Neural Computation, 10(4), 903-940, doi:10.1162/089976698300017557; Parent, P., & Zucker, S. W. (1989), "*Trace inference, curvature consistency, and curve detection*", IEEE Transactions on Pattern Analysis and Machine Intelligence, 11(8), 823-839, doi:10.1109/34.31445; Ross, W., Grossberg, S., & Mingolla, E. (2000), "*Visual cortical mechanisms of perceptual grouping: interacting layers, networks, columns, and maps*", Neural Networks, 13(6), 571-588, doi:10.1016/50893-6080(00)00040-X; Sha'asua, A., & Ullman, S. (1988), "*Structural Saliency: The Detection Of Globally Salient Structures using A Locally Connected Network*", Second International Conference on Computer Vision (pp. 321-327), Presented at the Second International Conference on Computer Vision, doi:10.1109/CCV. 1988.590008; VanRullen, R., Delorme, A., & Thorpe, S. (2001), "*Feed-forward contour integration in primary visual cortex based on asynchronous spike propagation*", Neurocomputing, 38-40, 1003-1009, doi:10.1016/S0925-2312(01)00445-3; Williams, L. R., & Jacobs, D. W. (1997), "*Stochastic Completion Fields: A Neural Model of Illusory Contour Shape and Salience*" Neural Computation, 9(4), 837-858, doi:10.1162/neco.1997.9.4.837; Yen, S. C., & Finkel, L. H. (1998), "*Extraction of perceptually salient contours by striate cortical networks*", Vision Research, 38(5), 719-741. doi:10.1016/S0042-6989(97)00197-1. Measurements needed for contour extraction may lie in a butterfly-shaped "association field" centered on a reference edge that reflects contour continuity principles, see Field, D. J., Hayes, A., & Hess, R. F. (1993), "*Contour integration by the human visual system: evidence for a local "association field"*", Vision Research, 33(2), 173-193, with an inhibitory region orthogonal to the edge, see FIG. 1; Geisler, W S, Perry, J. S., Super, B. J., & Gallogly, D. P. (2001), "*Edge co-occurrence in natural images predicts contour grouping performance*", Vision Research, 41(6), 711-724; Kapadia, M. K., Westheimer, G., & Gilbert, C. D. (2000), "*Spatial Distribution of Contextual Interactions in Primary Visual Cortex and in Visual Perception*", Journal of Neurophysiology, 84(4), 2048-2062; Li, Z. (1998), "*A Neural Model of Contour Integration* in the Primary Visual Cortex", Neural Computation, 10(4), 903-940. doi:10.1162/089976698300017557, that presumably reflects the tendency for only a single object contour at a time to pass through any given point in the image.

Identifying a set of image measurements that are most useful for contour extraction can be a crucial step, but may leave open the question as to how those measurements should be algorithmically combined to detect contours in natural images. A priori (e.g. geometric) models of edge/contour structure can provide important insights, but may face challenges, such as including the multiscale structure of natural object boundaries, lighting inhomogeneities, partial occlusions, disappearing local contrast, and optical effects such as blur from limited depth of field. All of these complexities, and others known and unknown, may in principle be treated as noise sources that randomly perturb filter values in the vicinity of a candidate edge, suggesting that a probabilistic, population-based approach to edge detection may be most appropriate. See Dollar, P., Tu, Z., & Belongie, S. (2006), "Supervised Learning of Edges and Object Boundaries", Proceedings of the 2006 IEEE Computer Society Conference on Computer Vision and Pattern Recognition—Volume 2 (pp. 1964-1971), IEEE Computer Society, Retrieved from http://portal.acm.org/citation.cfm?id=1153171.1153683; Konishi, S., Yuille, A. L., Coughlan, J. M., & Zhu, S. C. (2003), "Statistical Edge Detection: Learning and Evaluating Edge Cues", IEEE Transactions on Pattern Analysis and Machine Intelligence, 25(1), 57-74, doi:http://doi.ieeecomputersociety.org/10.1109/TPAMI.2003.1159946.

The way a population of filter responses $r_1, r_2 \ldots r_N$ should be combined to calculate the probability that an edge exists at a reference location and orientation may follow from Bayes rule. See Equations 1 below. Bayesian inference has had successes in explaining behavior in sensory and motor tasks. See Fiser, J., Berkes, P., Orbán, G., & Lengyel, M. (2010), "Statistically optimal perception and learning: from behavior to neural representations", Trends in Cognitive Sciences, 14(3), 119-130. doi:10.1016/j.tics.2010.01.003; Kording, K. P., & Wolpert, D. M. (2004), "Bayesian integration in sensorimotor learning", Nature, 427(6971), 244-247. doi: 10.1038/nature02169; Tenenbaum, J. B., Kemp, C., Griffiths, T. L., & Goodman, N. D. (2011), "How to Grow a Mind: Statistics, Structure, and Abstraction", Science, 331(6022), 1279-1285. doi:10.1126/science.1192788; Weiss, Y., Simoncelli, E. P., & Adelson, E. H. (2002), "Motion illusions as optimal percepts", Nature neuroscience, 5(6), 598-604; Yuille, A., & Kersten, D. (2006), "Vision as Bayesian inference: analysis by synthesis?", Trends in Cognitive Sciences, 10(7), 301-308. doi:10.1016/j.tics.2006.05.002; Yuille, A. L., & Grzywacz, N. M. (1988), "A computational theory for the perception of coherent visual motion", Published online: May 1988; |doi:10.1038/333071a0, 333(6168), 71-74. doi: 10.1038/333071a0. However, in the context of edge detection within a V1-like architecture, given that there are thousands of oriented filters within a small distance of a candidate edge, the need for human labeled ground truth data may make it necessary to fully populate the joint on-edge and off-edge likelihood functions, which grows exponentially more expensive with the number of filters used.

Konishi, S., Yuille, A. L., Coughlan, J. M., & Zhu, S. C. (2003), "Statistical Edge Detection Learning and Evaluating Edge Cues", IEEE Transactions on Pattern Analysis and Machine Intelligence, 25(1), 57-74, doi:http://doi.ieeecomputersociety.org/10.1109/TPAMI.2003.1159946, dealt with this "curse of dimensionality" by limiting their analysis to small sets of off-the-shelf edge filters centered on a candidate edge (up to 6 filters at a time). They used an adaptive binning method to efficiently tabulate the multi-dimensional on- and off-edge likelihood functions from preexisting human-labeled edge databases. Their approach led to improved edge detection performance compared to single-feature edge classifiers, but did not address the issue as to whether, or how, human labeled data could be collected in such a structured way as to facilitate the identification of filter combinations where the participating filters are individually (1) informative as to the presence of an edge, and (2) statistically independent both when an edge is present and when one is absent, that is "class conditionally independent" (CCI). In this special case of CCI filters, edge probability can be calculated based on much less human-labeled data. In particular, evaluating Bayes rule requires knowing only the 1-dimensional marginal likelihood distributions for each of the N filter values on and off edges, rather than the N-dimensional joint marginal distributions of the N filters together.

SUMMARY

Non-transitory, tangible, computer-readable storage media may contain a program of instructions that cause a computer system running the program of instructions to elicit from a human observer ground truth data useful in automatically detecting one or more features in images. The elicitation may include presenting an image to a human observer that has a visual indicator in an image, the visual indicator indicating having a location and orientation with respect to the image; asking the human observer to judge whether a particular image feature is present in the image at the location and orientation indicated by the visual indicator; receiving input from the human observer indicative of whether the particular image feature is present at the location and orientation indicated by the visual indicator; storing the input received from the human observer as part of the human-labeled ground truth data; and repeating the process described above one or more times in connection with a visual indicator that has a different location or orientation with respect to the image or that uses a different image. The stored human-labeled ground truth data may have a content that is useful in automatically detecting one or more features in other images.

The asking may include asking the human observer to rate their degree of certainty that the particular image feature is present in the image at the location and orientation indicated by the visual indicator.

The receiving may include receiving input from the human observer indicative of their degree of certainty that the particular image feature is present in the image at the location and orientation indicated by the visual indicator.

The visual indicator may indicate a size of the feature.

The visual indicator may indicate a direction of motion of the particular image feature during a sequence of video images.

Multiple image sequences with their associated visual indicators may be classified into multiple classifications. Each classification may only having images sequences with the same numeric, measured, image characteristic. The presenting, asking, receiving, and storing steps may be performed in connection with a predetermined number of image sequences and their visual indicators from each of the classifications.

The numeric, measured, image characteristics may collectively form a systematic sampling of a value range of a numeric characteristic or a combination of numeric characteristics.

Multiple images paired with visual indicators may be classified into multiple classifications, each classification only having images with the same numeric, measured, image characteristic. The presenting, asking, receiving, and storing steps may be performed in connection with a predetermined number of images and their visual indicators from each of the classifications.

The particular feature may be a curve, junction, or a compound feature consisting of any combination of the following: edges, curves, and junctions in a specified spatial relationship.

The common, numeric, measured, image characteristics may collectively form a systematic sampling of a value range of a numeric characteristic or a combination of numeric characteristics.

At least one numeric, measured, image characteristic may have a numeric range.

The numeric range may be sufficiently narrow as to result in substantial decorrelation of other numeric, measured, image characteristics.

After the repeating step, one or more other numeric, measured image characteristics of the images may be determined within each of the classifications that the human observer classified similarly during the receiving step, that are substantially statistically independent of each other, and that provide substantial information relevant to the presence of the particular image feature in the other images.

The particular image feature may be an edge.

Based on the human observer responses, the classification scheme is modified dynamically in the course of collecting human observer responses to concentrate human labeling effort within those classifications or to develop new classifications, where data is most needed to accurately estimate feature probability based on the collected human responses up to that point.

The visual indicator may indicate a region with defined ends. The asking the human observer may include asking the human observer to specify whether an edge is present in the image that enters the indicated region at one end, remains within the indicated region over the entire length of the region, and exits the region at the opposite end.

A ground truth data acquisition system may include a computer data processing system that includes at least one computer data hardware processor and other computer hardware components that, collectively, elicit from a human observer ground truth data in connection with one or more images that is useful in automatically detecting one or more features in other images. The system may implement any of the steps and functions that have been described herein.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 1 illustrates tangential vs. orthogonal regions surrounding a candidate edge.

FIG. 2A illustrates an oriented linear filter kernel. FIG. 2B illustrates a log pdf of filter responses measured at all locations and orientations in an image database. FIG. 2D illustrates a probability of an edge for a given linear response.

DETAILED DESCRIPTION OF ILLUSTRATIVE EMBODIMENTS

Figure 2C:
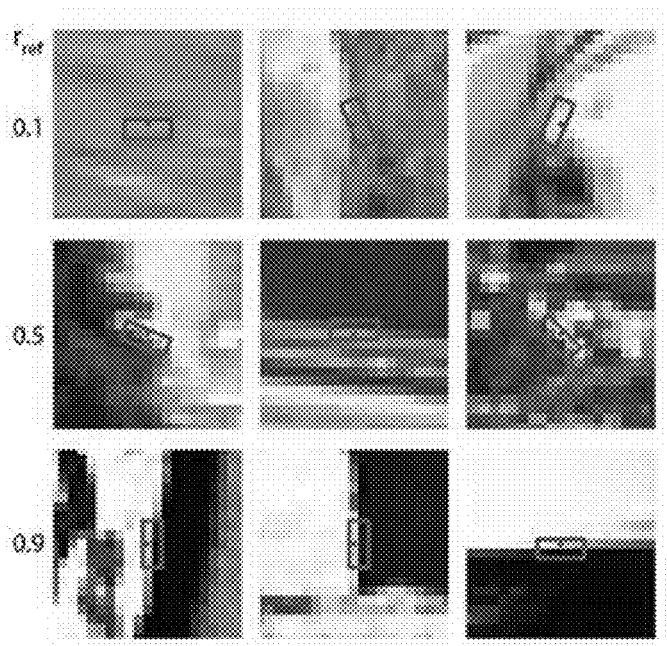
FIG. 2C illustrates example image patches at 3 linear responses levels measured at a reference location indicated by the red box. Marked red pixel within the red box indicates the bright side of the edge.

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Bayes rule may be used to calculate edge probability at a given location/orientation in an image based on a surrounding filter population. Beginning with a set of ~100 filters, a subset may be culled out that are maximally informative about edges, and minimally correlated to allow factorization of the joint on- and off-edge likelihood functions. Features of this approach may include an efficient method for ground-truth edge labeling by humans, with an emphasis on achieving class-conditional independence of filters in the vicinity of an edge. The resulting population-based edge detector may have zero parameters, may calculate edge probability based on a sum of surrounding filter influences, may be much more sharply tuned than underlying linear filters, and may effectively capture fine-scale edge structure in natural scenes.

An approach to edge detection may be taken that depends on class conditional independence (CCI) within a chosen filter set (that is, independence of the filter responses both when an edge is present and when one is absent). If/when the CCI assumption is satisfied, (see Jacobs, R. A., 1995, Methods for combining experts' probability assessments. Neural Computation, 7, 867-888) the on- and off-edge likelihood functions, consolidated in the denominator of Equation 2 below, can be factored into products of single-filter likelihood functions, and then rewritten in terms of a sum of log likelihood (LL) ratio terms, as illustrated by Equation 3 below.

The ability to factor the likelihood functions may lead to three important advantages: (1) the requirements for human-labeled data may be drastically reduced from the order of $x^N$ to $x \cdot N$, where N is the number of participating filters and x is the number of gradations in each filter output; (2) each LL ratio term can be expressed and visualized as a function of a single filter value $r_i$, making explicit the information that a filter at one location in an image carries about the presence of an edge at another; and (3) the positive and negative evidence from filters surrounding an edge (captured by these LL ratios) can be combined linearly in the overall edge probability calculation, and is thus a very simple calculation.

A series of steps to collect the needed ground truth edge data, to identify a set of informative CCI filters surrounding a candidate edge, and to parametrically represent their individual LL ratios, are now described. The performance of the resulting parameter-free edge detector is then evaluated, and the biological significance of the underlying population-based computation is discussed.

Methods

Bayesian Cue Combination

Following Jacobs, R. A., (1995, Methods for combining experts' probability assessments. Neural Computation, 7, 867-888), the cue combination problem in the context of edge detection, given filter values $r_1, r_2 \ldots r_N$ may be expressed in probabilistic terms via Bayes rule, $$P(\text{edge} \mid r_1, r_2 \ldots r_N) = \frac{P(r_1, r_2 \ldots r_N \mid \text{edge})P(\text{edge})}{P(r_2, r_2 \ldots r_N)} \quad \text{(Eq. 1)}$$

and then rewritten to make explicit the prior and likelihood ratios in the denominator.

$$= \frac{P(r_1, r_2 \ldots r_N \mid \text{edge})P(\text{edge})}{P(r_1, r_2 \ldots r_N \mid \text{edge})P(\text{edge}) + P(r_1, r_2 \ldots r_N \mid \overline{\text{edge}})P(\overline{\text{edge}})} \quad \text{(Eq. 2)}$$

$$= \frac{1}{1 + \frac{P(\overline{\text{edge}})}{P(\text{edge})} \cdot \frac{P(r_1, r_2 \ldots r_N \mid \overline{\text{edge}})}{P(r_1, r_2 \ldots r_N \mid \text{edge})}} \quad \text{(Eq. 3)}$$

$$= \frac{1}{1 + \text{prior ratio} \cdot \text{likelihood ratio}} \quad \text{(Eq. 4)}$$

Under the assumption of class-conditional independence among the N filters, the likelihoods in Equation 3 can be factored and rewritten in terms of a sum of N log-likelihood ratio terms, which in turn functions as the argument to a sigmoid function[[ ]]:

$$P(\text{edge} \mid r_1, r_2 \ldots r_N) = \quad \text{(Eq. 5)}$$

$$\frac{1}{1 + \frac{P(\overline{\text{edge}})}{P(\text{edge})} \cdot \exp\left(-\sum_{i=1}^{N} \log\left(\frac{P(r_i \mid \text{edge})}{P(r_i \mid \overline{\text{edge}})}\right)\right)}$$

Given that each term in the sum is a function of one filter's output assuming that transformed filter value is available, the overall edge probability computation can be expressed as a sum of influences from a set of surrounding filters that is then run through a sigmoid function.

A modified version of Bayes rule conditioned on the value of a reference filter $r_{ref}$ evaluated at the location/orientation where the edge probability is being calculated, may be used in the Results section to reduce higher-order statistical dependencies among the other contributing filters (see text for details and references):

$$P(\text{edge} \mid r_1, r_2 \ldots r_s, r_{ref}) = \quad \text{(Eq. 6)}$$

$$\frac{1}{1 + \frac{P(\overline{\text{edge}} \mid r_{rzl})}{P(\text{edge} \mid r_{rzl})} \exp\left(-\sum_{1} \log\left(\frac{P(r_i \mid \text{edge}, r_{rzl})}{P(r_1 \mid \overline{\text{edge}}, r_{rzl})}\right)\right)}$$

Image Database and Extraction of the Luminance Channel

RGB images were converted to the following three independent components using the method of Hyvarinen, A. (1999), "*Fast and robust fixed-point algorithms for independent component analysis*", IEEE Transactions on Neural Networks, 10(3), 626-634. doi:10.1109/72.761722, trained on a random sample of 1.5 million pixels from the Berkeley Segmentation database:

$$\begin{bmatrix} O_1 \\ O_2 \\ O_3 \end{bmatrix} = \begin{bmatrix} 5.2 & -4.9 & 1.7 \\ -1.3 & -1.9 & 3.0 \\ 1.0 & 0.0 & 1.0 \end{bmatrix} \begin{bmatrix} 0.7R \\ 1.1G \\ 1.0B \end{bmatrix}$$

The components $O_1$, $O_2$, $O_2$ roughly corresponded to red-green, blue-yellow and luminance channels, respectively. In this paper we used $O_2$ the luminance channel only.

Chernoff Information

Chernoff information may be used as a measure of distance between on-edge and off-edge likelihood distributions for a given filter Konishi, S., Yuille, A. L., Coughlan, J. M., & Zhu, S. C. (2003), "*Statistical Edge Detection: Learning and Evaluating Edge Cues*", IEEE Transactions on Pattern Analysis and Machine Intelligence, 25(1), 57-74. doi:http://doi-.ieeecomputersociety.org/10.1109/TPAMI.2003.1159946:

$$CI(P_{on}, P_{off}) = -\min_{0 \le \lambda \le 1} \log\left\{ \sum_{j=1}^{J} P_{on}^{\lambda}(y_j) P_{off}^{1-\lambda}(y_j) \right\} \quad \text{(Eq. 7)}$$

where $P_{on}=P(r \mid \text{edge})$, $P_{off}=P(r \mid \overline{\text{edge}})$, the $y_j$ are the filter response bins (50 bins in the range [0,1]), and $\lambda$ was set to 0.5 (Konishi, S., Yuille, A. L., Coughlan, J. M., & Zhu, S. C. (2003), "*Statistical Edge Detection: Learning and Evaluating Edge Cues*", IEEE Transactions on Pattern Analysis and Machine Intelligence, 25(1), 57-74), doi:http://doi.ieeecomputersociety.org/10.1109/TPAMI.2003.1159946).

Poisson Smoothing

To construct the on-edge and off-edge response distributions, kernel density estimation may be used, where each instance of a filter's value was spread along the x-axis of its likelihood function with a smoothing "kernel".

Results

Overview of Steps 450 images were used from the COREL database including a variety of indoor and outdoor scenes. Only the luminance channel was used (see Methods). Luminance images were convolved at a single scale with an oriented spatial difference operator as shown in FIG. 2A. The 5×2 pixel filter was applied at 16 orientations in even steps of 22.5 degrees. The center of rotation was the center of the shaded pixel. Filter responses were rectified at 0 and normalized to lie in the range $r_i \in [0,1]$. When the filter was applied at non-cardinal orientations, pixel values off the grid were determined by bilinear interpolation. The pdf of the filter's response at all locations and orientations in the database is shown in FIG. 2B. The filter had a mean response of 0.012 (out of a maximum of 1), and a roughly exponential fall off over most of the range so that, for example, the probability of measuring a filter value near 0.6 was 100,000 times lower than the probability of measuring a value near 0.

FIGS. 2A-2D illustrate a linear filter, its statistics, and its use in ground truth labeling. FIG. 2A illustrates an oriented linear filter kernel. Convolution results were rectified at 0 to obtain the filter response $r_i$. The pixel that denotes the location of the filter is marked by red shading. FIG. 2B illustrates a log pdf of filter responses measured at all locations and orientations in the database. FIG. 2C illustrates example image patches at 3 linear responses levels measured at the reference location (red rectangle). FIG. 2D illustrates probability of an edge for a given linear response (red data points). Fit to data (solid curve) is a sigmoid $y=1/(1+e^{-s(x-t)})$; s=9.9, t=0.3804.

As a precursor to computing local edge probability (LEP) based on a population of filters, first measured was (1) the prior edge probability P(edge) at a randomly chosen location, and (2) the posterior edge probability based on the reference filter value alone $P(edge|r_{ref})$. To compute the edge prior, 1,000 image patches were drawn at random from the database, and a randomly oriented reference location was marked by a red box corresponding to the 5×2 pixel filter profile shown in FIG. 2A. Human labelers were asked to judge whether an edge was present in each image that (1) spanned the length of the red box (i.e. entered and exited through opposite ends of the box; (2) remained entirely within the box; and (3) was unoccluded at the center of the box adjacent to the shaded pixel. Labelers were instructed to score edges as shown in Table 1.

| Score given | Interpretation | Assigned edge probability |
| --- | --- | --- |
| 1 | Certainly no edge | 0 |
| 2 | Probably no edge | 0.25 |
| 3 | Can't tell - around 50/50 | 0.5 |
| 4 | Probably an edge | 0.75 |
| 5 | Certainly an edge | 1 |

Table 1: Labeling system used to score edges at the reference location, with the corresponding interpretation and assigned edge probability.

The assigned edge probabilities were averaged over all image patches and labelers (total of 1,000 labels), yielding an estimate P(edge)=1.95%±0.3%.

Using a similar method, edge probability was measured at the reference location conditioned on $r_{ref}$, the filter value computed at the reference location itself (i.e., in the red box). Image patches were again drawn at random from the database, this time collected in narrow bins centered at 5 values of $r_{ref}=\{0.1, 0.3, 0.5, 0.7, 0.9\}$. Bin width was 0.02. Image patches with $r_{ref}$ values outside the bin ranges were discarded. The collection process continued until each bin contained 500 exemplars. Example patches are shown in FIG. 2C for 3 of the 5 values of $r_{ref}$, showing the clear tendency towards higher edge probability as the value of $r_{ref}$ increased. Using the same labeling scheme as above, edges were scored and scores were averaged within each bin. The result is plotted in FIG. 2D (red data) along with a sigmoidal fit (black solid curve).

General Case

A general case is considered in which multiple filters surrounding a reference location would be used, in addition to $r_{ref}$, to calculate the edge probability at the reference location (Equation 3). Multiple strategies, described in the following, were used to narrow down the large population of filters surrounding a reference location to a subset that is as CCI as possible. A goal was to include only the most informative filters in the chosen filter set, but also to avoid measuring the informativeness of large numbers of filters that would later be rejected based on their failure to meet the CCI criteria, the steps taken to minimize filter dependencies and maximize filter informativeness were interleaved so as to reduce overall computational effort.

For computational tractability, data collection was limited to the single line of filters cutting perpendicularly through the center of the reference box, for a total of 7 pixel positions×16 orientations=112 total filter candidates (see blue lines in FIG. 1).

Strategy for Reducing Class-Conditional Dependencies Between Neighboring Filters:

Neighboring filter responses in natural images may exhibit higher-order correlations that stem from the fact that nearby points in the world are often part of the same texture and/or subject to the same illumination or contrast conditions. These regional effects may induce a particular type of higher-order dependency between nearby filters, in which a strong response in one filter predicts a higher response variance in other filters (Karklin, Y., & Lewicki, M. (2003), "*Learning higher-order structures in natural images*", Network: Computation in Neural Systems, 14(3), 483-499. doi:10.1088/0954-898X/14/3/306; Parra, L., Spence, C., & Sajda, P. (2001), "*Higher-order Statistical Properties Arising from the Non-stationarity of Natural Signals*", Advances in Neural Information Processing Systems 13 (pp. 786-792), The MIT Press; Schwartz, O., & Simoncelli, E. P. (2001), "*Natural signal statistics and sensory gain control*", Nat Neurosci, 4(8), 819-825, doi:10.1038/90526; Zetzsche, C., & Röhrbein, F. (2001), "*Nonlinear and extra-classical receptive field properties and the statistics of natural scenes*", Network (Bristol, England), 12(3), 331-350). Such dependencies can be suppressed through divisive normalization (Carandini, Matteo, & Heeger, D. J. (2012), "*Normalization as a canonical neural computation*", Nat Rev Neurosci, 13(1), 51-62. doi:10.1038/nrn3136; Karklin, Y., & Lewicki, M. (2003), "*Learning higher-order structures in natural images*", Network: Computation in Neural Systems, 14(3), 483-499. doi:10.1088/0954-898X/14/3/306; Karklin, Y., & Lewicki, M. S. (2005), "*A Hierarchical Bayesian Model for Learning Nonlinear Statistical Regularities in Nonstationary Natural Signals*", Neural Computation, 17(2), 397-423. doi:10.1162/0899766053011474; Liang, Y., Simoncelli, E. P., & Lei, Z. (2000), "*Color channels decorrelation by ICA transformation in the wavelet domain for color texture analysis and synthesis*", IEEE Conference on Computer Vision and Pattern Recognition, 2000. Proceedings (Vol. 1, pp. 606-611 vol. 1), Presented at the IEEE Conference on Computer Vision and Pattern Recognition, 2000, Proceedings, doi:10.1109/CVPR.2000.855875; Parra, L., Spence, C., & Sajda, P.

(2001), "*Higher-order Statistical Properties Arising from the Non-stationarity of Natural Signals*", Advances in Neural Information Processing Systems 13 (pp. 786-792), The MIT Press; Schwartz, O., & Simoncelli, E. P. (2001), "*Natural signal statistics and sensory gain control*", Nat Neurosci, 4(8), 819-825. doi:10.1038/90526; Wainwright, M. J., & Simoncelli, E. P. (2000), "*Scale Mixtures of Gaussians and the Statistics of Natural Images*", IN ADV. Neural Information Processing Systems, 12, 855-861; Zetzsche, C., & Röhrbein, F. (2001), "*Nonlinear and extra-classical receptive field properties and the statistics of natural scenes*", Network (Bristol, England), 12(3), 331-350; Zhou, C., & Mel, B. W. (2008), "*Cue combination and color edge detection in natural scenes*", Journal of Vision, 8(4). doi:10.1167/8.4.4). Adopting a different but related strategy (with secondary benefits as discussed below), the 1-D likelihood distributions were tabulated for each candidate filter conditioned both on the edge/no edge distinction, and on the value of $r_{ref}$ in order to obtain the likelihood functions $P(r_i|\text{edge}, r_{ref}=C)$ and $P(r_i|\text{no edge}, r_{ref}=C)$. Fixing the contrast at the reference location served a similar decorrelating function among surrounding filters as would a divisive normalization, in the sense that image patches within any given $r_{ref}=C$ bin exhibit far less regional (i.e. non-contour-related) modulation than image patches in general (data not shown).

Given that C took on the same 5 values as were used previously to measure $P(\text{edge}|r_{ref})$, all the image patches needed to construct the likelihood functions for the 112 filter candidates had already been collected and labeled.

A secondary advantage of "slicing up" and separately collecting the likelihood functions at a range of $r_{ref}$ values, beyond its effect of de-correlating surrounding filters, is that the approach greatly increases the amount of true on-edge data from which all the on-edge likelihood functions are constructed.

Strategy for Choosing Informative Filters

The preceding steps produced on-edge and off-edge likelihood functions for all 112 filters used, tabulated separately at 5 different contrast levels at the reference location. Given that likelihood ratios would ultimately need to be computed, involving division operations with small, uncertain denominators, the tabulated $r_i$ data was smoothed using kernel density estimation.

Piecewise Gaussian Fits and Evaluation of Likelihood Functions at Unlabeled Contrasts A parametric representation allowed the evaluation of filter likelihood functions at arbitrary reference filter contrasts, i.e. not limited to the 5 discrete values of $r_{ref}$ at which labeled data was actually collected.

Figure 3B:
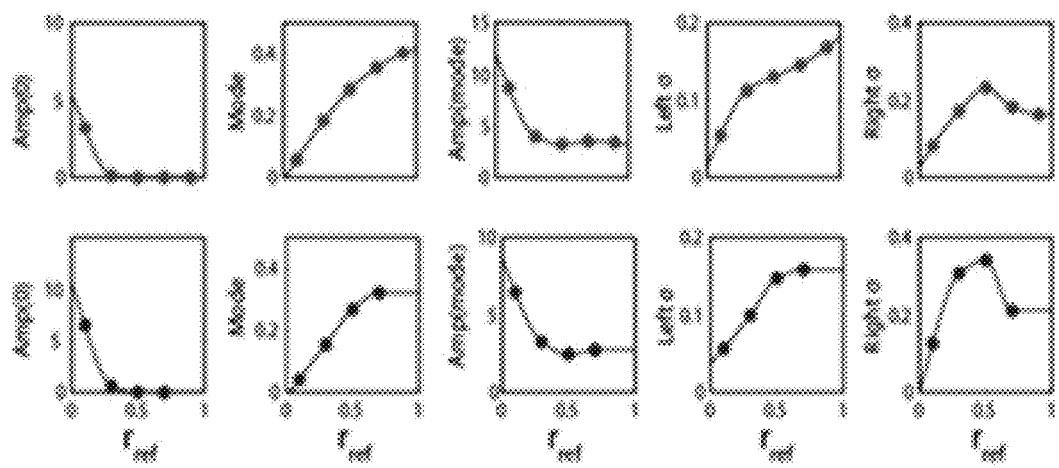
FIG. 3B illustrates plots of 5 parameters used to fit Poisson-smoothed likelihoods as a function of reference filter contrast.
Figure 3C:
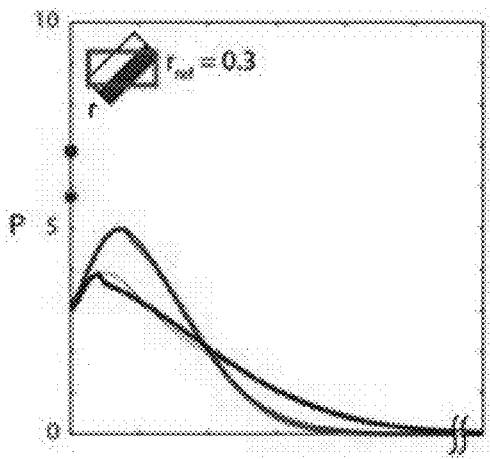
FIG. 3C illustrates examples of on-edge likelihood functions generated from a parametric model at a range of reference filter values, with Poisson-smoothed data shown superimposed in thin black lines for 5 cases for which labeled data was actually collected.
Figure 3C:
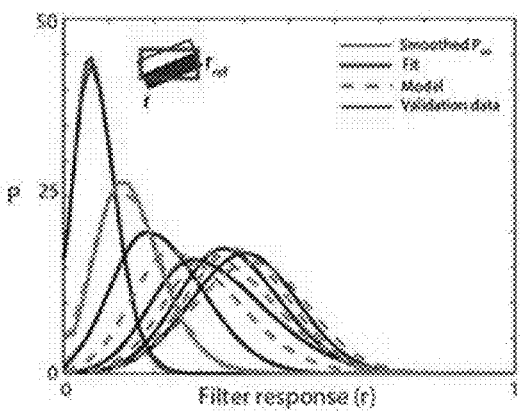
Figure 3A:
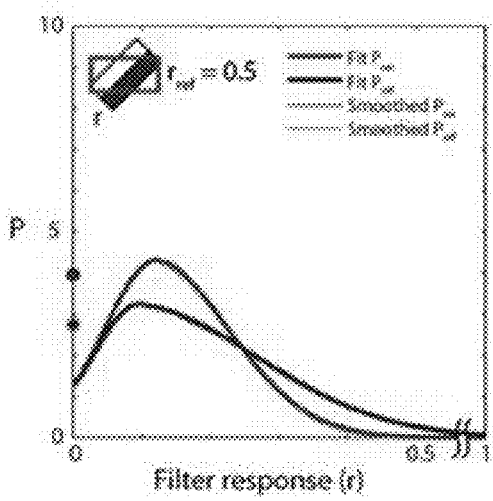
FIG. 3A illustrates a distribution of filter responses at 45° relative to a reference location for $r_{ref}=0.3$ (upper panel) and $r_{ref}=0.5$ (lower panel).

Example fits of the on-edge and off-edge distributions at 2 contrast levels are shown in FIG. 3A for the filter rotated 45° relative to the reference location.

The parameters of the fits were plotted at the 5 reference contrast levels for which labeled data was collected. A piecewise cubic Hermite interpolating polynomial was then fit through each of the 5 parameter plots for both the on-edge and off-edge distributions for each filter. Plots of the 5 spline-fit functions are shown in FIG. 3B for a filter rotated 22.5° relative to the reference location. The spline fits allowed the parameters of the on-edge and off-edge likelihood distributions to be generated for any value of reference filter contrast (FIG. 3C).

FIGS. 3A-3C illustrate modeling likelihood functions of neighboring filters. FIG. 3A illustrates distribution of filter responses at 45° relative to the reference location for $r_{ref}=0.3$ (upper panel) and $r_{ref}=0.5$ (lower panel). Red curves are for when an edge is present at the reference location, blue curves for when an edge is absent. Each panel shows Poisson-smoothed data (thin curves) and parametric fits (thick curves). FIG. 3B illustrates plots of the 5 parameters used to fit the Poisson-smoothed likelihoods as a function of reference filter contrast. Off-edge case had only first 4 data points, given that only very rarely does an image patch contain no edge when $r_{ref}=0.9$. FIG. 3C illustrates examples of on-edge likelihood functions generated from the parametric model at a range of reference filter values, with the smoothed data shown superimposed in thin black lines for the 5 cases for which labeled data was actually collected (red curves). Green dashed lines are on-edge likelihood functions generated from the parametric model at intermediate, unlabeled reference filter values. Generalization to new data was good: green solid line shows Poisson-smoothed data collected at $r_{ref}=0.2$, which was not part of the training set (quality of fit to model prediction: $r^2=0.99$).

Kernel-smoothed likelihood functions are shown for a neighboring filter as thin lines in FIG. 3A (black curves for on-edge, magenta for off-edge), along with parametric fits shown as superimposed thick lines and dots.

Figure 4A:
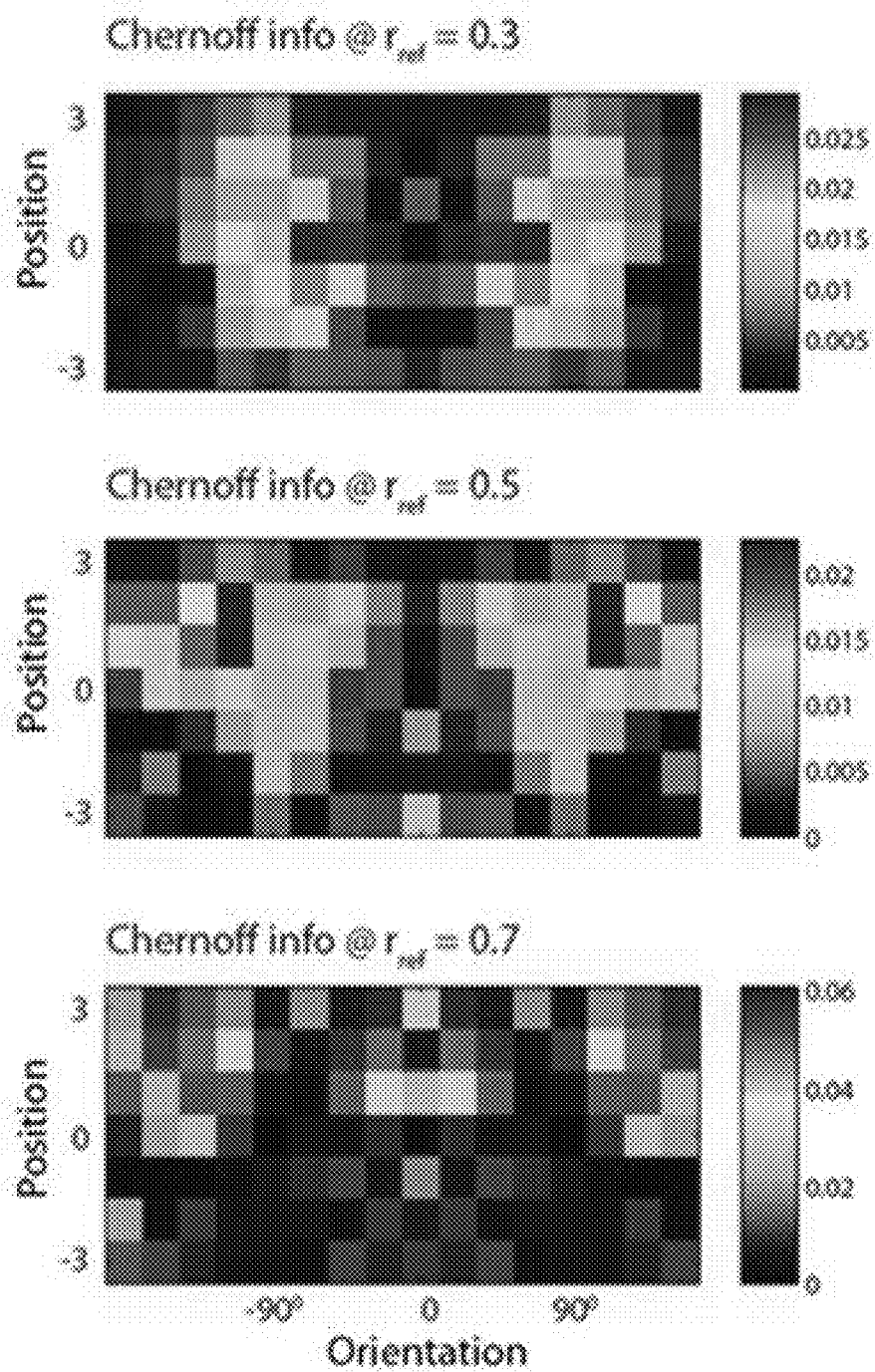
FIG. 4A illustrates Chernoff Information of neighboring filter at three different reference contrasts ($r_{ref}=C=0.3$, 0.5 and 0.7).

Following the approach of Konishi, S., Yuille, A. L., Coughlan, J. M., & Zhu, S. C. (2003), "*Statistical Edge Detection: Learning and Evaluating Edge Cues*", IEEE Transactions on Pattern Analysis and Machine Intelligence, 25(1), 57-74, doi:http://doi.ieeecomputersociety.org/10.1109/TPAMI.2003.1159946, we used Chernoff information (see Methods) to evaluate the informativeness of the 112 filters at each of the three middle values of C (0.3, 0.5, 0.7; FIG. 4A). Filters were ranked within each C level (from 1=best to 112=worst) and the ranks for each filter were averaged across C levels, weighted by the log probability of encountering that C level in the database (see FIG. 4B). For viewing convenience, the weighted ranks were inverted (newrank=112−oldrank) so that the best filters had the highest scores (FIG. 3B). The top 30% of the filters (=34) were kept for further evaluation (FIG. 4C).

Figure 4B:
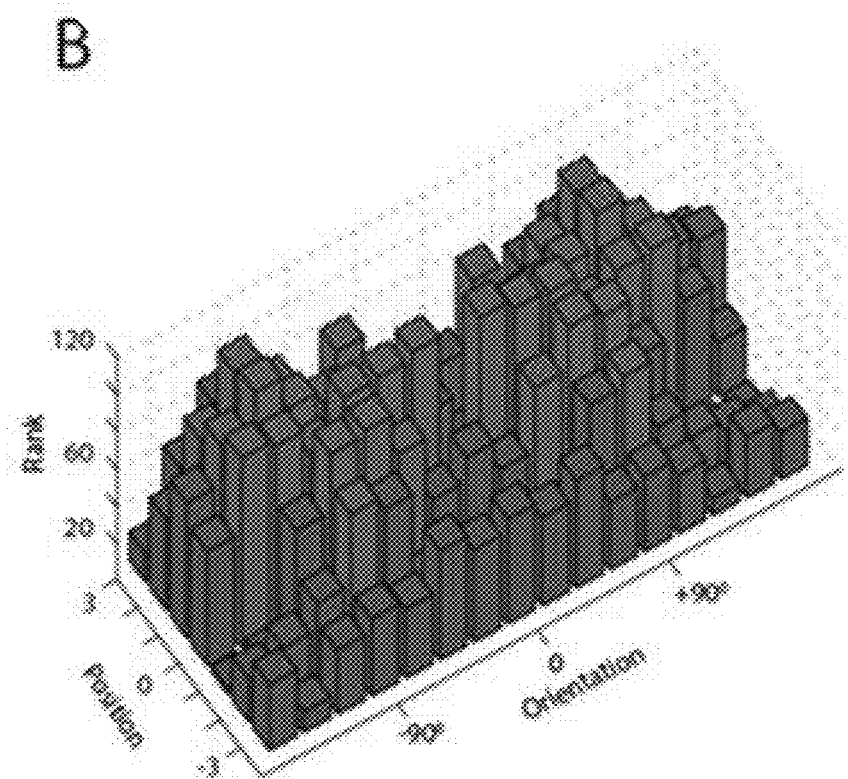
FIG. 4B illustrates weighted average ranks over contrast levels for all neighboring filters, inverted so tall columns indicate more information.
Figure 4C:
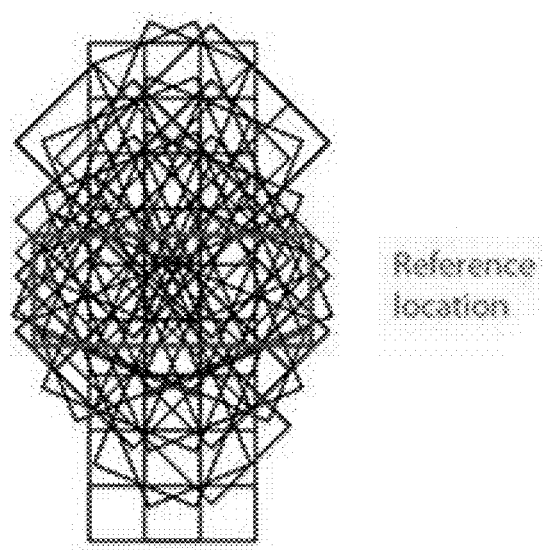
FIG. 4C illustrates position and orientation of most informative filters in the orthogonal region shown relative to a reference location.

FIG. 4 illustrates selecting informative filters. FIG. 4A illustrates Chernoff information of neighboring filters at three different reference contrasts ($r_{ref}=C=0.3$, 0.5 and 0.7). FIG. 4B illustrates weighted average ranks over contrast levels for all neighboring filters, inverted so tall columns indicate more information. Top 30% of the 112 filters are marked in red. FIG. 4C illustrates position and orientation of the most informative filters in the orthogonal region are shown relative to the reference location.

Minimizing Overlap Correlations

Figure 5:
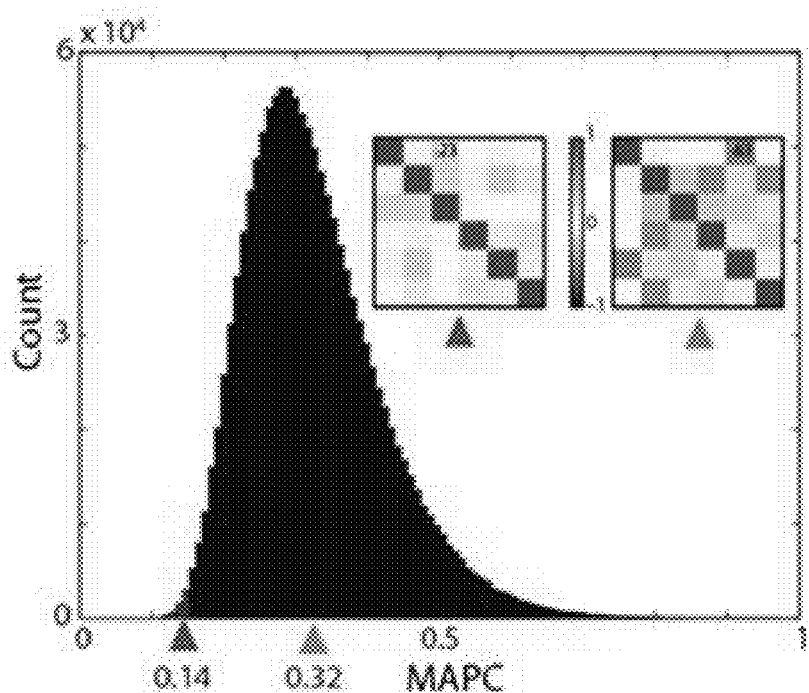
FIG. 5 illustrates distribution of mean absolute pairwise correlations (MAPC) scores for ~1.3 million 6-wise combinations of the most informative filters.

Simple physical overlap of two or more filters' regions of support can produce correlations between their outputs—consider two filters with the same center but slightly different orientations. The 34 remaining filter candidates were searched for subsets of N filters that had low mean absolute pairwise correlations (MAPC) between their responses:

$$MAPC = \frac{1}{(N^2-N)} \sum_{i=1}^{N} \sum_{j=1, i \neq j}^{N} |\rho(r_i, r_j)| \qquad \text{(Eq. 8)}$$

where N=6 and $\rho(r_i, r_j)$ is the correlation between 2 filters i and j over all pixel locations and orientations in the image database. The distribution of MAPC values is shown in FIG. 5 for the $\binom{34}{6} \approx 1.3$ million 6-wise filter combinations tested. The low MAPC score for the filter set that would ultimately be chosen is marked with a red triangle, while the average MAPC value over all 6-wise filter combinations is marked with a green square. 6×6 pairwise correlation matrices for the two marked cases are shown as insets. For the average case, a single representative filter set was chosen. The 3,362 filter sets with correlation scores in the lowest 0.25% of the MAPC distribution (lower red tail, including the red triangle case) were set aside for performance testing on labeled natural edges.

FIG. 5 illustrates distribution of mean absolute pairwise correlations (MAPC) scores for ~1.3 million 6-wise combinations of the most informative filters. 6×6 pairwise correlation matrices are shown at upper right for 2 cases: red triangle corresponds to a filter set with one of the lowest correlation scores; this set was eventually used in the edge detection algorithm; green square shows a case with an average MAPC score. Least inter-correlated 0.25% of filter sets (left tail of distribution, shaded red) were carried forward for further processing.

Final Strategy for Co-Optimizing Filter Independence and Informativeness: Select for Sharp Tuning on Natural Object Edges Among the most common structures that elicit false positive responses from an edge detector are true edges that are slightly misaligned with the detector in position and/or orientation. To make the final choice among the remaining ~3,400 filter sets, therefore, the likelihood functions for each filter set was incorporated in turn into Bayes rule (Eq. 6), and measured the position and orientation tuning curves of the resulting probabilistic edge detector. The filter set with the sharpest tuning in both position and orientation would be selected. A slightly reformatted version of Bayes rule was used in which the on- and off-edge likelihood functions were conditioned also on the value of $r_{ref}$:

$$p(\text{edge} \mid r_{ref}, r_1, r_2 \ldots r_6) = \frac{1}{1 + e^{-\log \text{ odds ratio}}} \quad \text{Eq. 6}$$

where, $$\log \text{ odds ratio} = \log\left(\frac{p(\text{edge} \mid r_{ref})}{p(\overline{\text{edge}} \mid r_{ref})}\right) + \sum_i \log\left(\frac{p(r_i \mid \text{edge}, r_{ref})}{p(r_i \mid \overline{\text{edge}}, r_{ref})}\right)$$

In one additional technical hurdle, given that $r_{ref}$ could take on any value in the range of [0,1] in images, whereas the likelihood functions for each filter were collected at only 5 discrete values of $r_{ref}$, a parametric fitting scheme was developed to allow likelihood functions to be interpreted for any value of $r_{ref}$. To interpolate likelihood functions for arbitrary values of $r_{ref}$, for each filter, each of the likelihood fit parameters were plotted at the 5 values of $r_{ref}$ for which data was collected, and then interpolated the data points with splines (FIG. 3B). In this way, fit parameters for intermediate values of $r_{ref}$ could be extracted, and the corresponding likelihood functions reconstructed. Examples of interpolated likelihood functions are shown in (FIG. 3C, green curves). For purposes of cross validation, the fitting scheme was used to predict the likelihood function for a new set of labeled data collected for $r_{ref}$=0.2 (green solid curve).

To generate orientation and position tuning curves for each filter set, the ~3,000 image patches in the database that has been labeled as containing edges were presented to each edge detector at 16 orientations (at the reference position) and 7 positions (at the reference orientation), and tuning curves were generated. Examples of tuning curves for the filter set that would eventually be chosen are shown in FIG. 6 at 5 levels of contrast. Full width at half maximum (FWHM) scores were extracted from each of the ~3,000 tuning curves for each filter set, and the scores were averaged and histogrammed (FIG. 6C-D). The filter set that had the lowest average rank in the two histograms, with FWHM values marked by red triangles, was the filter set adopted for use in the edge detection algorithm. For comparison, green triangles show the FWHM values for a single linear filter at the reference location.

Figure 6A:
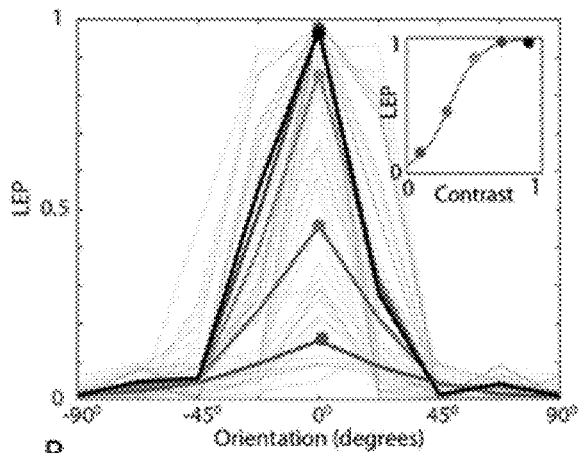
FIG. 6A-FIG. 6D illustrate orientation and positioning tuning of the local edge probability (LEP) calculated for each of ~3,400 filter sets tested.
Figure 6C:
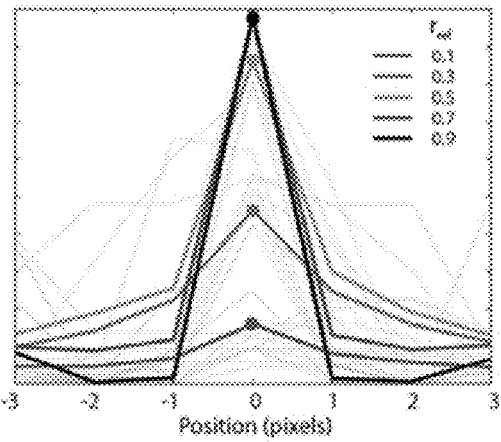
Figure 6B:
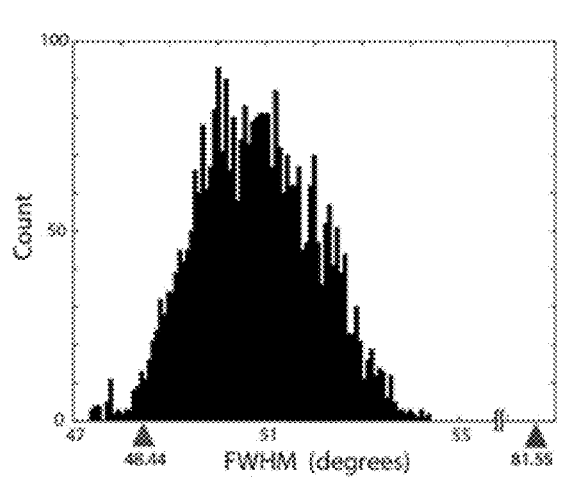
Figure 6D:
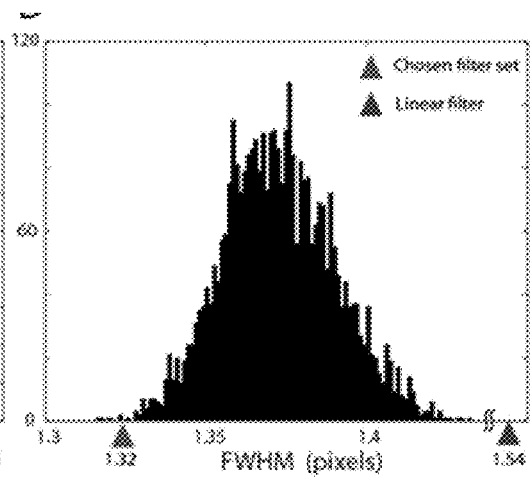

FIG. 6A-D illustrate orientation and position tuning of the local edge probability (LEP) calculated for each of the ~3,400 filter sets tested. FIG. 6A illustrates an example orientation tuning curves for the chosen filter set are shown at 5 values of $r_{ref}$. Averages for each reference value are shown as thick colored lines. Inset shows response at preferred orientation at 5 different levels of contrast. FIG. 6B illustrates, for each tested filter set, tuning curves were generated for each of the ~3,000 human-labeled edges in the database. Full width at half maximum (FWHM) values were calculated for each tuning curve, the results were averaged, and the average tuning width for that filter set was entered into the histogram. The orientation tuning score of the chosen filter set is marked by a red triangle. The much larger FWHM score for a single linear filter at the reference location is marked by the green square. FIG. 6C illustrates positional tuning curves covering 3 pixels above and below the reference position. FIG. 6D illustrates distribution of average FWHM values for the positional tuning curves. Tuning score for the chosen filter set is again marked by a red triangle, and the tuning for a linear filter at the reference location is marked by a green square.

Performance Evaluation on Natural Images

Figure 7:
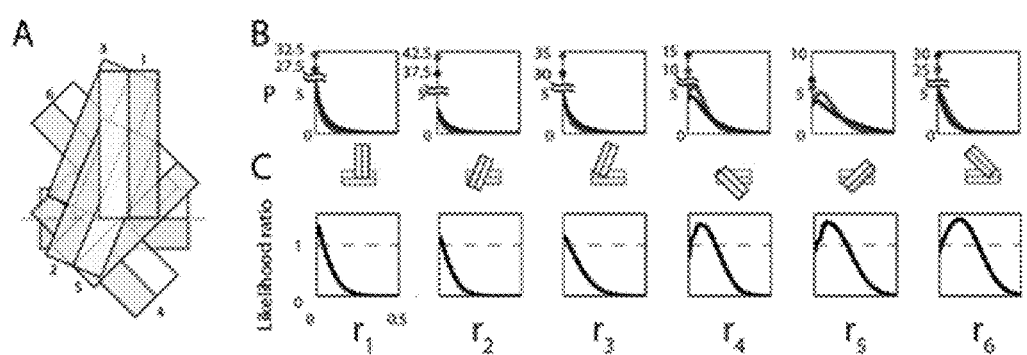
FIG. 7A-FIG. 7C illustrate a set of 6 neighboring filters finally chosen for local edge probability computation.

FIGS. 7A-C illustrate the set of 6 neighboring filters finally chosen for the local edge probability computation. FIG. 7B illustrates the on-edge (red) and off-edge (blue) likelihoods for each of the 6 neighboring filters when $r_{ref}$=0.3. FIG. 7C illustrates likelihood ratios (i.e. ratio of red and blue curves in B) for each filter.

The final filter set is depicted in FIG. 7A, along with its on-edge and off-edge likelihood functions (FIG. 7B) and likelihood ratios (FIG. 7C) conditioned on a reference filter value of 0.3. Likelihood functions and ratios at higher and lower values of $r_{ref}$ were similar in form, but were pushed towards higher or lower ends of the $r_i$ range, respectively.

Figure 8A:
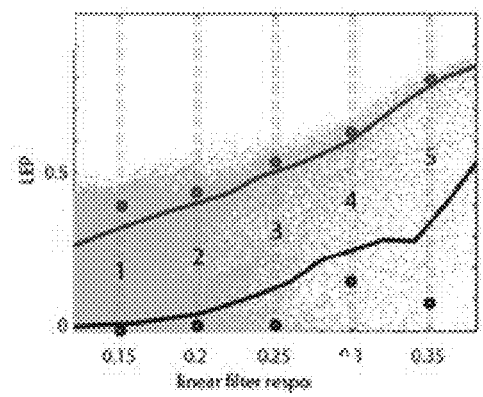
FIG. 8A-FIG. 8C illustrate linear response vs. local edge probability.
Figure 8C:
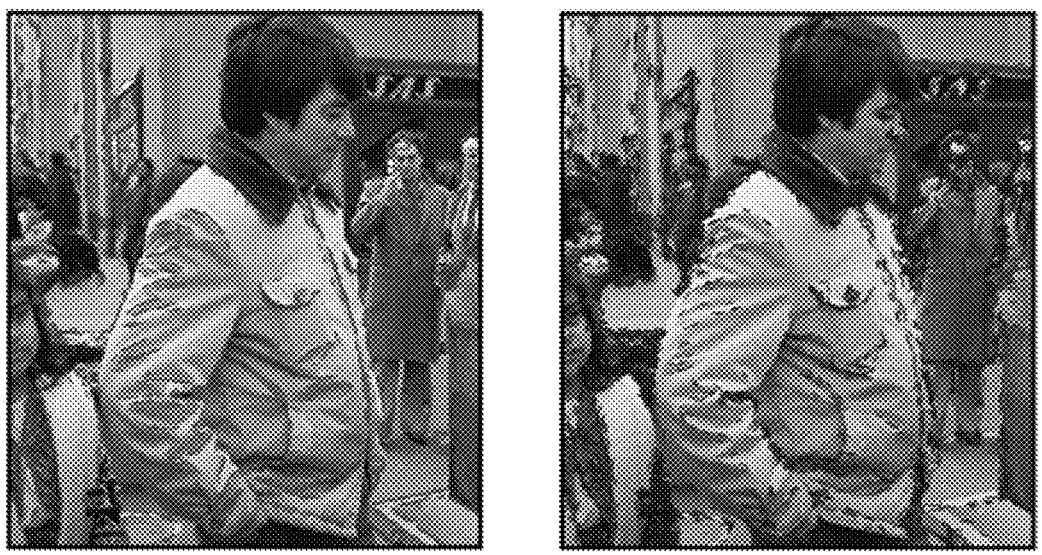
Figure 8B:
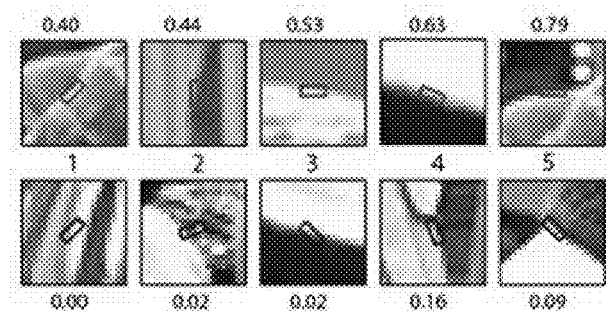

FIGS. 8A-C illustrate linear response vs. local edge probability. FIG. 8A illustrates scatter plot of linear filter response vs. the LEP for the image shown in C. Colored dots mark cases at the $90^{th}$ (red) and 10% (blue) percentile within each of the 5 marked bins along the linear response axis (bin width=0.02). FIG. 8B illustrates image patches corresponding to marked examples in A are shown with their corresponding LEP scores. Note the much higher LEP scores, and edge probability, in top vs. bottom row. FIG. 8C illustrates all image locations corresponding to the scatter plot in A with LEP scores over the $80^{th}$ percentile (red line in A) were marked with red line segments in the left panel, and all locations below the $20^{th}$ percentile (blue line in A) were marked by blue line segments in the right panel. Red lines are generally well aligned with object edges whereas most blue lines are misplaced or misoriented.

FIG. 8A shows a scatter plot of linear reference responses vs. calculated edge probability at all positions and orientations in the image shown in FIG. 8C. Notably, for a given linear score plotted on the horizontal axis, substantial variation was seen in the calculated edge probability. To determine whether this vertical spread was consistent with the judgments of human labelers, image patches were identified at the $10^{th}$ (blue dots) and $90^{th}$ (red dots) percentiles of the LEP range in 5 evenly spaced bins along the $r_{ref}$ axis. The image patches are shown in FIG. 8B, along with their corresponding LEP scores. Inspection of the patches confirm that edge probability within the reference boxes (according to the scoring rubric of Table 1) was much higher for the $90^{th}$ percentile cases (top row) than the $10^{th}$ percentile cases (bottom row). To extend this type of comparison to a more global perspective, we located all sites in the image where the linear score was between 0.12 and 0.38 (corresponding to all grey dots in FIG. 8A). All cases above the $80^{th}$ percentile in the LEP score distribution (i.e. above the red line in FIG. 8A) were presumptive "good edges" and were labeled with red line segments in FIG. 8C (left frame). Similarly, all cases below the $20^{th}$ percentile of the LEP distribution for the corresponding linear score (below the blue line in FIG. 8A) were presumptive "bad edges" and were labeled with blue line segments in FIG. 8C (right frame). The upper cutoff of 0.38 on the linear axis was chosen because at that linear score, the edge probability reached 50% (FIG. 8A), so that the visual distinction between "good" and "bad" edges within any given linear bin above that value would necessarily begin to fade. Consistent with the examples of FIG. 8B, red-labeled edges were much more likely to be properly aligned and positioned relative to actual object edges, whereas blue edges were typically misaligned by a pixel or two, and/or misoriented.

Figure 9:
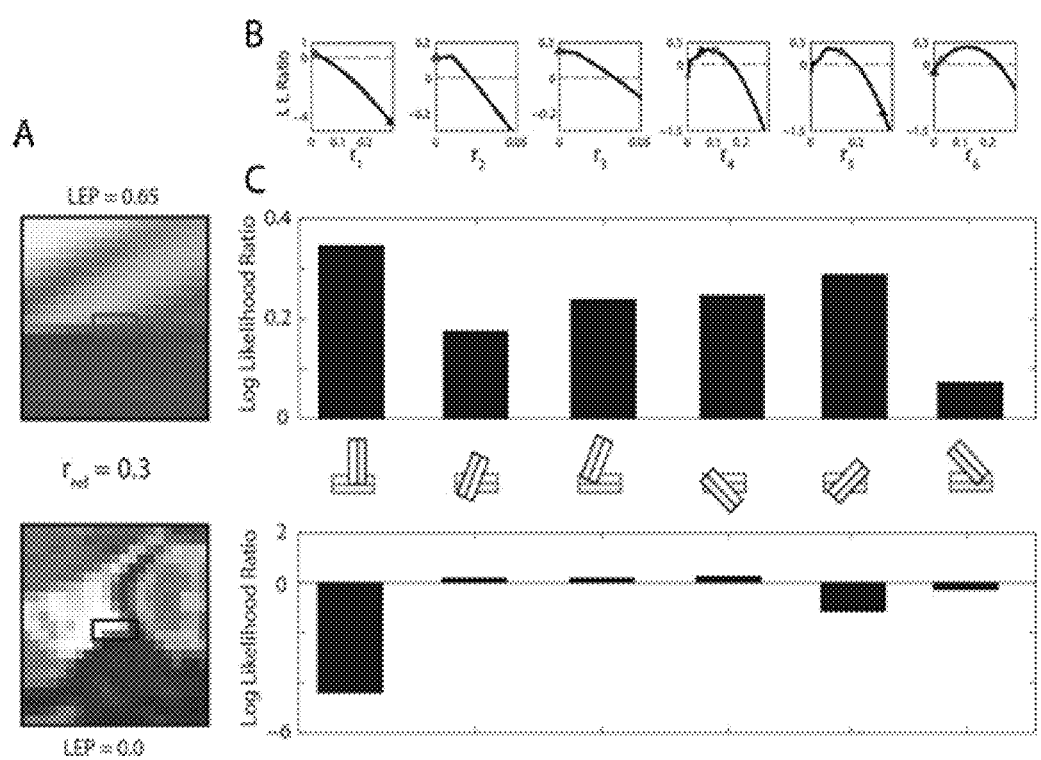
FIG. 9 illustrates local edge probability computation at two locations with same linear score but very different LEPs.

FIGS. 9A-9C illustrate local edge probability computation at 2 locations with same linear score but very different LEPs. FIG. 9A illustrates image patches with marked reference locations. Linear filter response is same ($r_{ref}$=0.3) in both patches. FIG. 9B illustrates log likelihood ratio curves, and values marked with red and blue symbols for the 6 neighboring filters applied to the upper and lower image patches, respectively. FIG. 9C illustrates log likelihood ratios shown as bar heights. Resulting LEP values are shown above and below the image patches in A.

To examine more closely what accounted for the spread in LEP values for a fixed linear reference score, image were extracted patches from the top and bottom of the LEP range for a linear reference score of 0.3. The two image patches are shown in FIG. 9A, and the corresponding log likelihood ratios, the fundamental quantities summed to determine the LEP according to Eq. 6, are shown in FIG. 9C. The consistent positive values for the top case vs. the two large negative values in the bottom case explain the very different LEP scores (0.65 vs. 0.0).

Figure 10:
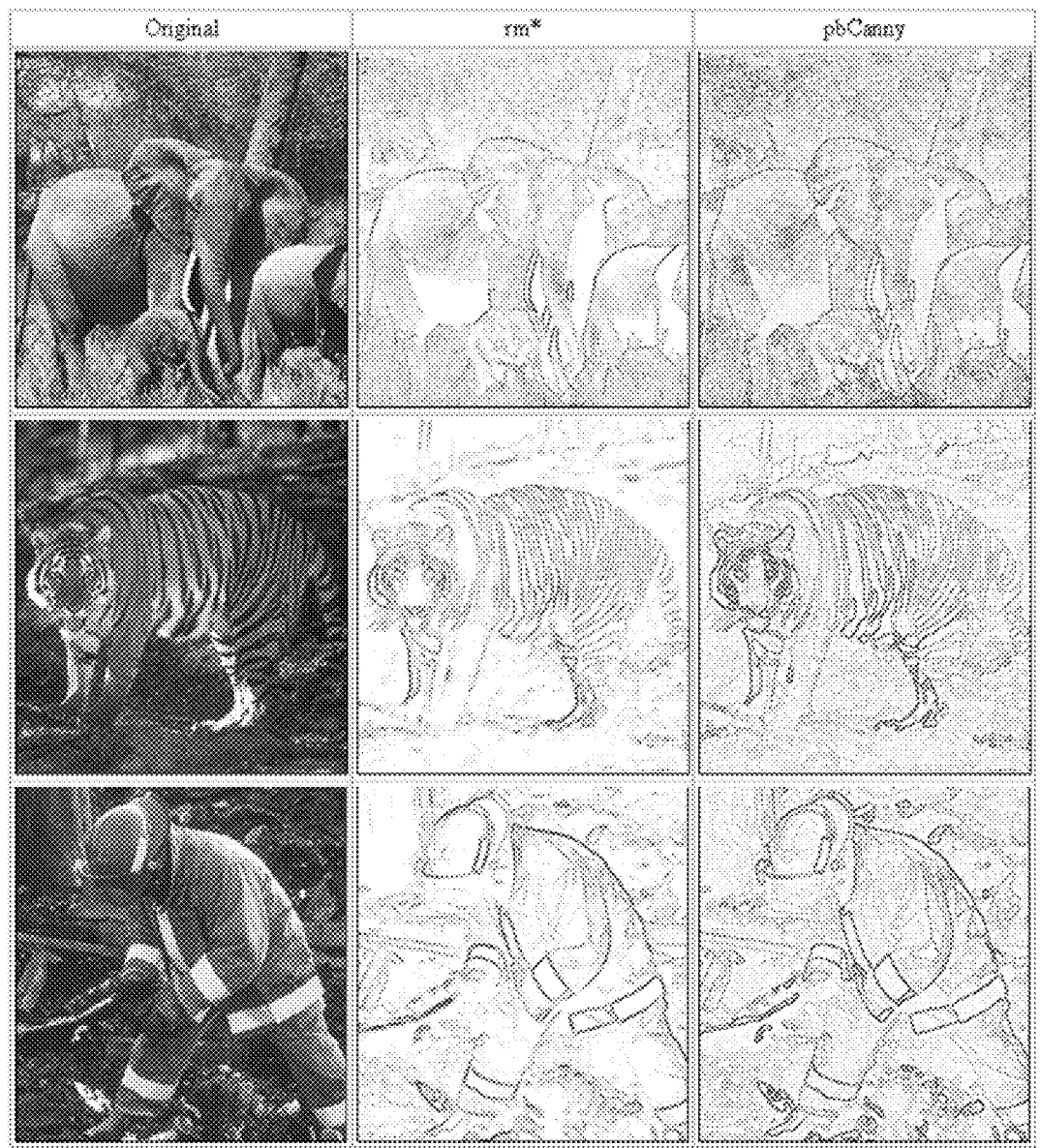
FIG. 10 illustrates results of applying the probabilistic edge detection algorithm to natural images.

FIG. 10 illustrates results of applying the algorithm to natural images. Maximum value of local edge probability across all orientations is shown at each pixel as the grey level. PbCanny results were generated with scale parameter of 1.

As a final form of evaluation, the local edge probability was computed at every pixel position and orientation in the luminance channel of entire images, and displayed the maximum LEP value over all orientations as each pixel's greyscale value (scaled between 0 and 255, with darker pixels indicating higher edge probability). The overall edge detection algorithm is referred to as rm* (for "-r- esponse based on -m- ultiple *riented filters"). Example images are shown in FIG. 10, in comparison to a graded Canny-like algorithm (Pb-Canny) developed at UC Berkeley (Martin, D. R., Fowlkes, C. C., & Malik, J. (2004), "*Learning to Detect Natural Image Boundaries Using Local Brightness, Color, and Texture Cues*", IEEE Trans. Pattern Anal. Mach. Intell., 26(5), 530-549). The rm* algorithm, with no free parameters, was found to do a good job extracting bona fide local edge structure at the 5-pixel length scale.

Discussion

Performance Evaluation

A large number and variety of edge detection methods have been developed over the years (see http://iris.usc.edu/Vision-Notes/bibliography/contentsedge.html for an annotated list of papers on various methods, and Papari, G., & Petkov, N. (2011), "*Edge and line oriented contour detection: State of the art*", Image and Vision Computing, 29(2-3), 79-103, doi: 10.1016/j.imavis.2010.08.009 for recent review). Evaluating the relative quality of edge/contour detection algorithms is intrinsically a difficult task, however. Ground truth edge databases have been developed for this purpose (Bowyer, K., Kranenburg, C., & Dougherty, S. (1999), "Edge detector evaluation using empirical ROC curves", Computer Vision and Pattern Recognition, 1999. IEEE Computer Society Conference on (Vol. 1, p. 359 Vol. 1), Presented at the Computer Vision and Pattern Recognition, 1999, IEEE Computer Society Conference on, IEEE, doi:10.1109/CVPR.1999.786963; Geisler, Wilson S, & Perry, J. S. (2009), "*Contour statistics in natural images: grouping across occlusions*", Visual Neuroscience, 26(1), 109-121, doi:10.1017/S0952523808080875; Martin, D., Fowlkes, C., Tal, D., & Malik, J. (2001), "*A database of human segmented natural images and its applications to evaluating segmentations algorithms and measuring ecological statistics*"), which differ in terms of (1) their specificity of labeling, i.e. whether the ground truth includes location, orientation, scale, and edge polarity as in our approach, vs. location only, or anything in between; (2) their accuracy of labeling, i.e. within a few pixels vs. sub-pixel accuracy; and (3) the method for selecting what to label, for example, every pixel vs. a random subsample vs. an automatically selected subsample vs. "label what you want". Depending on these choices, benchmarking results may be more or less helpful in comparing the quality of different algorithms. For a Bayesian approach such as the ones described herein, a "complete" set of image locations/orientations would be wanted accurately labeled for edge probability. Precision-recall (PR) curves would then provide a useful metric of edge detection performance. A main practical challenge in producing reliable PR curves is pinning down the on-edge likelihood distribution. Knowing the true edge probability at the low end of a filter's response range is (1) difficult because in order to accurately determine the edge probability in a low response bin (which could easily be <0.001), a large number of edges in that bin must be accurately labeled; and (2) important because the prior probability of being in these low response bins is very high (FIG. 2B), so that the overall shape of the on-edge likelihood distribution is strongly affected by the edge probability estimates in these bins. Low response bins can also become contaminated with large numbers of false positive edges when edges are either inaccurately labeled (i.e. off by a pixel or two) or when labeling is left to human discretion: human labelers are often tempted to label at a spatial scale or mixture of scales that may be mismatched to the (unknown) scale(s) of the edge detectors that will later be evaluated, such as labeling the smooth outer perimeter of a tree or bush. This is crucial given that both the existence and orientation of edges in natural images are scale-dependent concepts. Human labelers may also reject certain classes of strong edges based on a perceived lack of importance, for example the stripes produced by window shades, or the large number of 'uninteresting' strong edges contained within textures. Given that unimportant or uninteresting strong edges may constitute a large fraction of all strong edges in natural images, these labeling choices can dilute edge probability at the strong-response end of the on-edge likelihood distribution. Taken together, these effects can produce a substantial rearrangement of the probability density in the on-edge distribution along the detector's response axis, mostly pushing towards the low end of the response range. The greater overlap of the on- and off-edge distributions that this rearrangement causes leads to the appearance of reduced edge detection performance in a precision-recall analysis. Presumably for reasons such as these, benchmarking scores, and the rankings they generate on specific images, often seem visually unintuitive.

Given the difficulties in interpreting PR curves, we opted instead to assess edge detection performance by (1) comparing tuning curves of the LEP-based edge detection algorithm with those of the underlying linear filters: tuning in position and orientation was significantly sharpened by the population-based probability calculation; (2) verifying that the spread in local edge probability for a fixed linear filter score was consistent with the judgments of human labelers; this acted as a form of cross validation since the examples examined were not part of the ground truth training data (FIG. 8); and (3) making qualitative visual comparisons between maps of edge probability generated by the algorithm compared to other edge/contour-detection algorithms (including a graded Canny variant (implementation from the Berkeley boundary detection benchmark toolset), see FIG. 10). Overall, despite having no free parameters, the LEP-based responses were well tuned on natural edges, were predictive of human judgments on unlabeled data, and produced semantically well-structured edge maps on a 5-pixel length scale.

CONCLUSION

The probabilistic approach to edge detection described here can likely be adapted to other types of visual features. However, the constraint that the probability calculation be expressible in terms of sums of positive and negative interactions among nearby cells, tied to the CCI assumption, means that the process outlined here, whether applied to edges or other features, may only be a first stage in a multi-stage process. Nonetheless, the ability to break a complex natural feature-extraction process into a first quasi-linear stage where cue independence roughly holds, followed by additional processing stages where bona fide nonlinear interactions can occur, has the advantage of modularity, and seems likely to simplify the overall computational scheme.

Image data may be loaded into a ground truth data acquisition system. The image data may be representative of an image and may have originated from any of several sources, such as a camera, document scanner, medical imaging device, satellite imager, and/or another type of spatial sensor array. The image data may be digitized versions of hand drawn pictures, or artificial images such as produced by computer graphics programs or computer-based graphical design tools. The image data may be arrays of data that have a spatial interpretation and include meaningful regions separated by boundaries.

The image may be an individual, still image or part of a series of images that form a video. Other images in the video may be processed in the same way.

Figure 11:
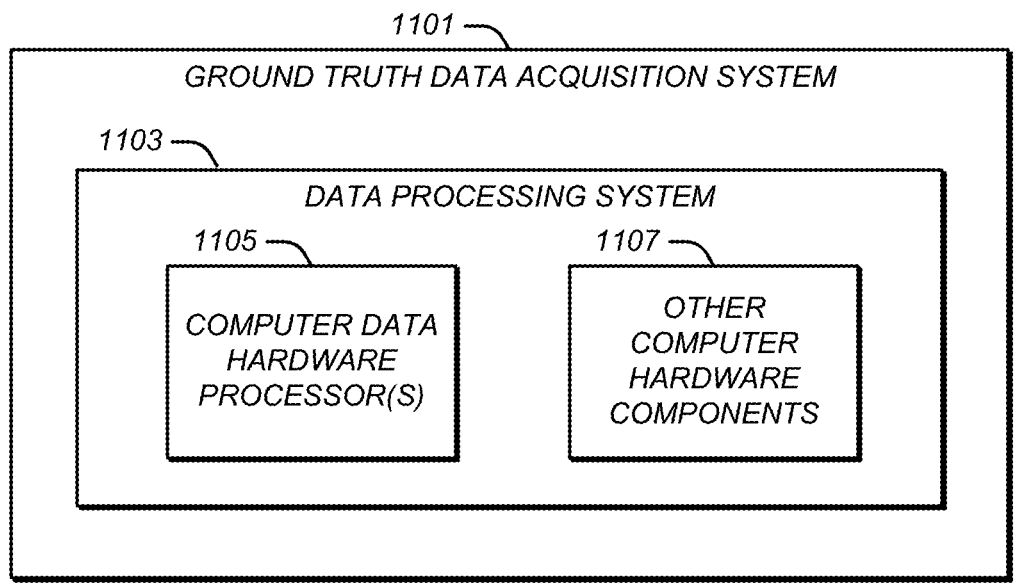
FIG. 11 is an example of a ground truth data acquisition system.

The image data may comprise values at multiple locations in the image, such as at each pixel in the image. The image data may contain one or more channels of information, such as RGB (color) images or multispectral images. The algorithms that are discussed below refer to edge-detection in a single channel extracted from the image, such as the intensity channel, or some other channel which could be a raw channel (e.g. the red value in an RGB image) or a combination or transformation of original image channels, such as a red-green opponent channel or hue or saturation FIG. 11 is an example of a ground truth data acquisition system 1101. As illustrated in FIG. 11, the ground truth data acquisition system 1101 may include a data processing system 1103 containing one or more computer data hardware processors 1105 and other computer hardware components 1107, such as one or more tangible memories (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, pointing devices, displays, microphones, sound reproduction systems, and/or touch screens).

The data processing system 1103 may be configured to perform one, all, or any combination of the functions and processes that have been described above and/or in the claims below.

The data processing system 1103 may be a desktop computer or a portable computer, such as a laptop computer, a notebook computer, a tablet computer, a PDA, a smartphone, or part of a larger system, such a vehicle, appliance, and/or telephone. The data processing system may include one or more computers at the same or different locations. When at different locations, the computers may be configured to communicate with one another through a wired and/or wireless network communication system.

The data processing system 1103 may include software (e.g., one or more operating systems, device drivers, application programs, and/or communication programs). When software is included, the software includes programming instructions and may include associated data and libraries. When included, the programming instructions are configured to implement one or more algorithms that implement one or more of the functions of the data processing system 1103, as recited herein. The description of each function that is performed by the data processing system 1103 also constitutes a description of the algorithm(s) that performs that function.

The software may be stored on or in one or more non-transitory, tangible storage devices, such as one or more hard disk drives, CDs, DVDs, and/or flash memories. The software may be in source code and/or object code format. Associated data may be stored in any type of volatile and/or non-volatile memory. The software may be loaded into a non-transitory memory and executed by one or more processors.

Figure 12:
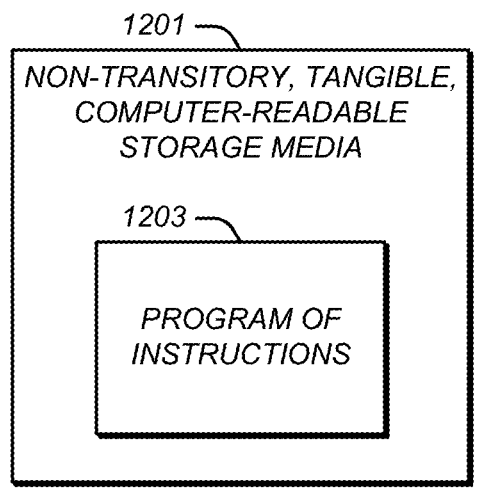
FIG. 12 is an example of a non-transitory, tangible, computer-readable storage media containing a program of instructions.

FIG. 12 is an example of a non-transitory, tangible, computer-readable storage media 1201 containing a program of instructions 1203. The program of instructions may cause the data processing system 1103 to perform the functions of the data processing system 1103 as described above, when loaded in and run by the data processing system 1103.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits, and advantages. These also include embodiments in which the components and/or steps are arranged and/or ordered differently.

For example, the visual indicator used in FIG. 2 to identify an oriented edge was a red rectangle. Alternatives include lines of different colors, thicknesses, or levels of transparency. An alternative to solid lines could be blinking lines or moving (marquee) dashed lines. The pixels corresponding to the indicated area might also be modulated, such as by modulating their brightness. The length of the indicated edge could have been indicate by arrows perpendicular to the edge pointing to the ends of the putative edge location or other types of length markers. Shapes other than a rectangle could have been used, such as a flared rectangle, wider at the ends than in the middle, or a bulbous rectangle wider in the middle than at the ends. The ends of the indicated area could also have been omitted. Visual indicators for other types of features would be tailored to the shape of the feature. For example, a curved box could be used for human labeling of curves, or an L-shaped area could be indicated for judging the presence of an L-junction. The more precision in the indicator, that is, the less tolerance to changes in position, orientation, width, length, etc., the more accurate the labeling data will generally be.

Indicators could also include an visual cue indicating feature type in case multiple feature types are being simultaneously labeled that have the same general shape and size. For example, a different indicator appearance may be used to distinguish object edges vs. shadow edges, or sharp edges vs. blurry edges, or the boundaries of animals vs. their backgrounds vs. all other types of objects and their backgrounds.

Response Scheme

The response scheme for human observers could be binary ("edge present" vs. "edge absent"), or have any number of graded values indicating different levels of perceived edge strength or edge probability. Human responses could be given verbally, or through keypresses, or by clicking on an on-screen response panel.

Image Presentation

Images could be presented with unlimited time for labeling, or could be speeded, so that labels must be entered within a certain time window.

Measurements Used for Classifying Image/Indicator Pairs

The scheme used to classify images based on numerical measurements prior to presenting them to human observers can vary. Classification can be based on a single measurement or multiple image measurements in combination, such as a combination of nearby filter values. Or, the measurement(s) can be arbitrary functions of one or more filter values or other more general computations on images. The classification scheme need not use explicit value ranges for classification based on numeric variables, but may choose a sample of images whose numeric values used for classification fit some distributional criteria, such as approximating a uniform distribution over the space of classification variable values.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts, or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as "first" and "second" and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element preceded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

The invention claimed is:

1. Non-transitory, tangible, computer-readable storage media containing a program of instructions that cause a computer system running the program of instructions to elicit from a human observer ground truth data useful in automatically detecting one or more features in images by doing at least the following:

presenting an image to a human observer that has a visual indicator in an image, the visual indicator indicating a location and orientation with respect to the image;

asking the human observer to judge whether a particular image feature is present in the image at the location and orientation indicated by the visual indicator;

receiving input from the human observer indicative of whether the particular image feature is present at the location and orientation indicated by the visual indicator;

storing the input received from the human observer as part of the ground truth data; and repeating the process described above one or more times in connection with a visual indicator that has a different location or orientation with respect to the image or that uses a different image;

classify multiple images paired with visual indicators into multiple classifications, each classification only having images with the same numeric, measured, image characteristic; and perform the presenting, asking, receiving, and storing steps above in connection with a predetermined number of images and their visual indicators from each of the classifications, wherein the stored ground truth data has a content that is useful in automatically detecting one or more features in other images.

2. The media of claim 1 wherein:

the asking includes asking the human observer to rate their degree of certainty that the particular image feature is present in the image at the location and orientation indicated by the visual indicator; and the receiving includes receiving input from the human observer indicative of their degree of certainty that the particular image feature is present in the image at the location and orientation indicated by the visual indicator.

3. The media of claim 1 wherein the visual indicator indicates a size of the feature.

4. The media of claim 1 wherein the visual indicator indicates a direction of motion of the particular image feature during a sequence of video images.

5. The media of claim 1 where the numeric, measured, image characteristics collectively form a systematic sampling of a value range of a numeric characteristic or a combination of numeric characteristics.

6. The media of claim 1 wherein the particular feature is a curve, junction, or a compound feature consisting of any combination of the following: edges, curves, and junctions in a specified spatial relationship.

7. The media of claim 1 wherein each common, numeric, measured, image characteristics collectively forms a systematic sampling of a value range of a numeric characteristic or a combination of numeric characteristics.

8. The media of claim 1 wherein at least one numeric, measured, image characteristic has a numeric range.

9. The media of claim 8 wherein the numeric range is sufficiently narrow as to result in substantial decorrelation of other numeric, measured, image characteristics.

10. The media of claim 9 wherein, after the repeating step, the program of instructions causes the computer system running the program of instructions to determine one or more other numeric, measured image characteristics of the images within each of the classifications that the human observer classified similarly during the receiving step, that are substantially statistically independent of each other, and that provide substantial information relevant to the presence of the particular image feature in the other images.

11. The media of claim 10 wherein the particular image feature is an edge.

12. The media of claim 1 wherein, based on the human observer responses, the classification scheme is modified dynamically in the course of collecting human observer responses to concentrate human labeling effort within those classifications or to develop new classifications, where data is most needed to accurately estimate feature probability based on the collected human responses up to that point.

13. The media of claim 1 wherein the particular image feature is an edge.

14. The media of claim 13 wherein:

the visual indicator indicates a region with defined ends; and the asking the human observer includes asking the human observer to specify whether an edge is present in the image that enters the indicated region at one end, remains within the indicated region over the entire length of the region, and exits the region at the opposite end.

15. A ground truth data acquisition system comprising a computer data processing system that includes at least one computer data hardware processor and other computer hardware components that, collectively, elicit from a human observer ground truth data in connection with one or more images that is useful in automatically detecting one or more features in other images by doing at least the following:

presenting an image to a human observer that has a visual indicator in an image, the visual indicator indicating having a location and orientation with respect to the image;

asking the human observer to judge whether a particular image feature is present in the image at the location and orientation indicated by the visual indicator;

receiving input from the human observer indicative of whether the particular image feature is present at the location and orientation indicated by the visual indicator;

storing the input received from the human observer as part of the ground truth data; and repeating the process described above one or more times in connection with a visual indicator that has a different location or orientation with respect to the image or that uses a different image;

classify multiple images paired with visual indicators into multiple classifications, each classification only having images with the same numeric, measured, image characteristic; and perform the presenting, asking, receiving, and storing steps above in connection with a predetermined number of images and their visual indicators from each of the classifications, wherein the stored ground truth data has a content that is useful in automatically detecting one or more features in other images.

16. The system of claim 15 wherein the computer data processing system is configured to form a systematic sampling of a value range of a numeric characteristic or a combination of numeric characteristics.

* * * * *